United States Patent [19]
Stalsberg et al.

[11] Patent Number: 5,456,407
[45] Date of Patent: Oct. 10, 1995

[54] TWO TERMINAL LINE VOLTAGE THERMOSTAT

[75] Inventors: Kevin J. Stalsberg, White Bear Lake; Jim E. Ingalls, Fridley; Steve R. Hoglund, Minneapolis, all of Minn.

[73] Assignee: Electric Power Research Institute, Inc., Palo Alto, Calif.

[21] Appl. No.: 218,484

[22] Filed: Mar. 25, 1994

[51] Int. Cl.⁶ .................................................. F23N 5/20
[52] U.S. Cl. ...................... 236/46 R; 219/501; 307/66
[58] Field of Search .................. 219/501; 236/46 R; 165/12; 307/66

[56] References Cited

U.S. PATENT DOCUMENTS

| | | | |
|---|---|---|---|
| 4,404,813 | 9/1983 | Paddock et al. | 374/208 X |
| 4,776,514 | 10/1988 | Johnstone et al. | 219/510 |
| 4,948,044 | 8/1990 | Cacciatore | 236/46 R |
| 5,008,775 | 4/1991 | Schindler | 374/208 X |
| 5,304,781 | 4/1994 | Stalsberg | 219/501 |

*Primary Examiner*—William E. Wayner
*Attorney, Agent, or Firm*—Flehr, Hohbach, Test, Albritton & Herbert

[57] ABSTRACT

A two terminal line voltage thermostat includes a switch which effectively connects line voltage to a heater load. The entire process is controlled by an integrated circuit microcontroller which is powered by a rectified voltage from a transformer secondary connected to a primary which is in series with the heater load. Backup battery power is provided to maintain limited functions of the microcontroller in the event of overall power loss. The microcontroller is programmed to meet the temperature sensing and control requirements specific to a two terminal electric baseboard heating installation.

5 Claims, 5 Drawing Sheets

TWO TERMINAL LINE VOLTAGE THERMOSTAT

The present invention relates to a two terminal line voltage thermostat and more particularly to a microcontrolled thermostat with setback features which normally drives heater loads such as electric base board types.

BACKGROUND OF THE INVENTION

Both U.S. Pat. No. 4,776,514 and application Ser. No. 980,983, filed Nov. 24, 1992 and now U.S. Pat. No. 5,304,781, illustrate a two terminal line voltage thermostat in which one of the terminals is connected to, for example, a baseboard heater load and the other is connected to the other side of the line voltage. Then the other terminal of the heater load is connected to the opposite side of the line voltage. In the above patent and application there is described a transformer technique by which the control circuitry of the thermostat is powered from the line voltage during either on or off conditions of the heater load. In-two-terminal applications, sophisticated thermostats are available, for example, Honeywell Inc. has a model T498S, which uses a microcontroller, powered by battery only, to schedule and manage temperature control setback activity; the temperature sensing and control are performed mechanically with a bimetal plate and mechanical switch. Honeywell also has a model, T4798, which uses a microcontroller for setback activity as well as temperature sensing and control.

OBJECT AND SUMMARY OF THE INVENTION

It is a general object of the present invention to provide an improved two terminal line voltage thermostat.

In accordance with the above object, there is provided a two terminal line voltage thermostat including a switch for connecting the line voltage across a heater load connected to one of its terminals with the other of the two terminals connected to the line voltage, the thermostat comprising a transformer having voltage and current primary windings and a secondary winding. The switch in a heater on condition energizes only the current winding and in a heater off condition energizes both the voltage and current windings. Blocking capacitor means connected to the voltage winding provides a high impedance series circuit to the heater load with the switch in the heater off condition. A relay coil actuates the switch between the heater on and heater off conditions and is connected to the current winding. Relay contacts are protected during make-and-break transitions by triac means. Temperature responsive means receive power from the secondary winding in both the heater on and heater off conditions. Integrated circuit controller means are responsive to the temperature responsive means for actuating the relay coil and triac gate and are connected to and receive power from the secondary winding. Backup battery means are connected to the integrated circuit controller means and energizes it in response to a loss of power from the secondary winding, and include means for preventing any current drain from the battery when power is being received from the secondary winding.

From another aspect, the invention also includes as part of the temperature responsive means, a thermistor spaced from a mounting board to reduce temperature sensing errors due to thermal coupling between the mounting board and thermistor, thereby leading to higher sensitivity to undesirable immediate temperature swings in the vicinity of the thermostat device. The integrated circuit controller includes time delay filter means for smoothing such rapid changes in the temperature sensed by the thermistor. Finally the integrated circuit controller means includes a halt mode and a hold mode which are activated in response to a power loss to cause the controller to enter the halt mode retaining only its random access memory and time-of-day and to eliminate all other power using functions, and then after a predetermined time of a number of hours the controller would enter a hold mode where only RAM retention occurs and time-of-day is not supported.

DETAILED DESCRIPTION OF PREFERRED EMBODIMENT

Figure 1:
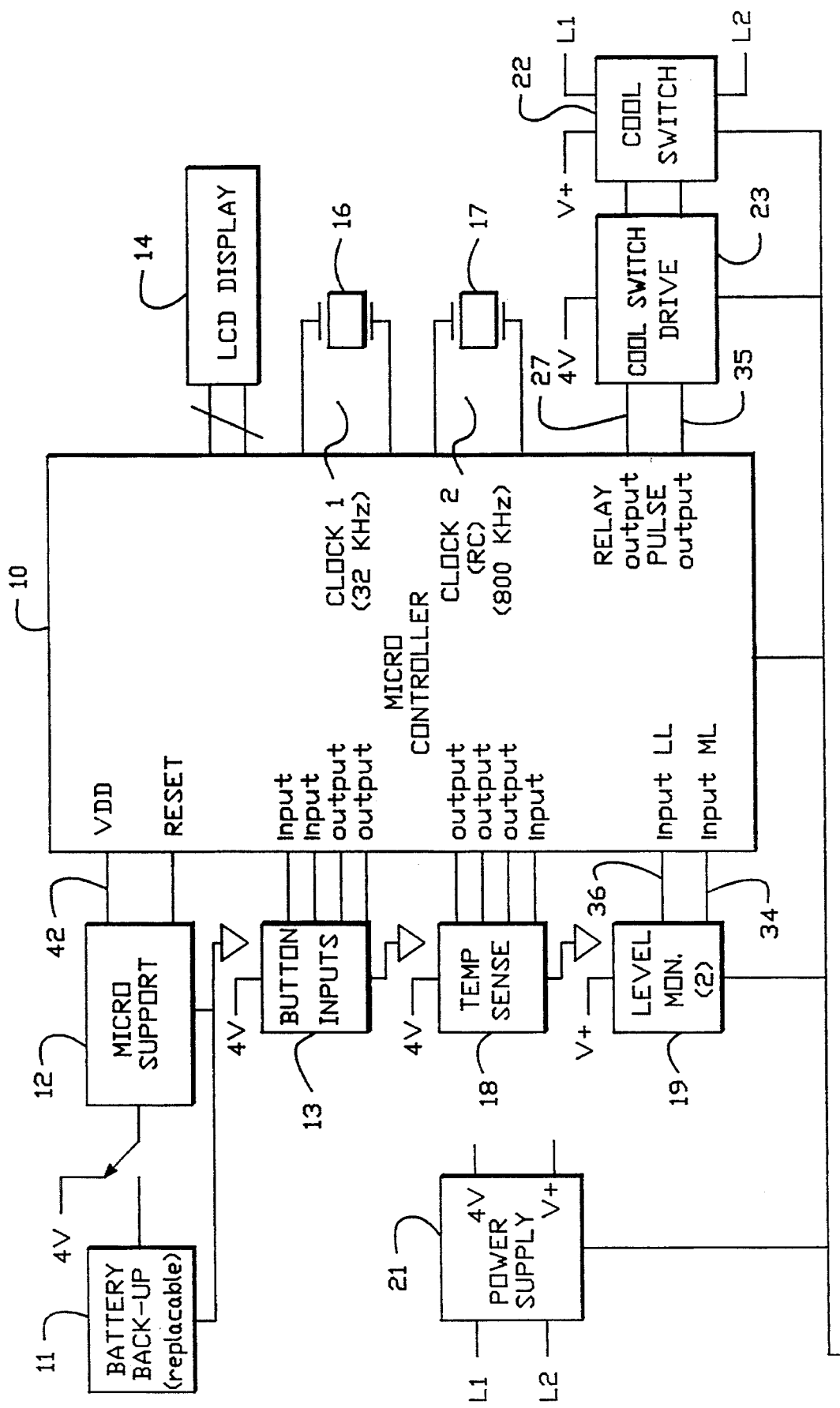
FIG. 1 is a block diagram embodying the present invention.

FIG. 1 illustrates the overall block diagram of the thermostat of the present invention where two terminals are illustrated as L1 and L2. As will be shown in greater detail in conjunction with FIG. 2, one terminal is connected to one side of the line voltage, the other terminal to the heater load such as an electric base board heater with the other side of that load being connected to the other side of the line voltage. Thus, the unit of FIG. 1 is a stand alone unit.

The main control function is, of course, performed by the microcontroller 10 which may be, for example, a model LC5866H, manufactured by the Sanyo Corporation. This controller has halt and hold modes; in the halt mode clock-time is slowed and energy is conserved and in the hold mode only minimal functions are performed. However, the microcontroller is customized as will be discussed below. To provide power to microcontroller 10 (in case of power loss) there is a replaceable backup battery 11 and associated micro-support circuitry 12. This feeds into the power input of the microcontroller 10 labeled Vdd.

To input information and to display relevant input and output information such as setback temperatures and times there is a button input or keypad unit 13 and a liquid crystal display (LCD) unit 14. A pair of clocks 16 and 17 provide as indicated fast and slow timing for the microcontroller 10. For sensing the ambient temperature there is a temperature sensing unit 18 which has three outputs and one input and interfaces with the microcontroller 10. A pair of level monitors 19 sense both the common d.c. voltage level and the relay pull-in voltage as will be discussed below.

A power supply 21 is, of course, directly connected to the line voltage and provides both a common d.c. output voltage designated 4 V and a relay pull-in voltage designated V+. Finally to switch the heater load on and off, there is a cool switch 22 and a cool switch drive unit 23. All of the foregoing circuitry is related to a common but it is not grounded. The above patent application shows a similar ungrounded concept.

Figure 2:
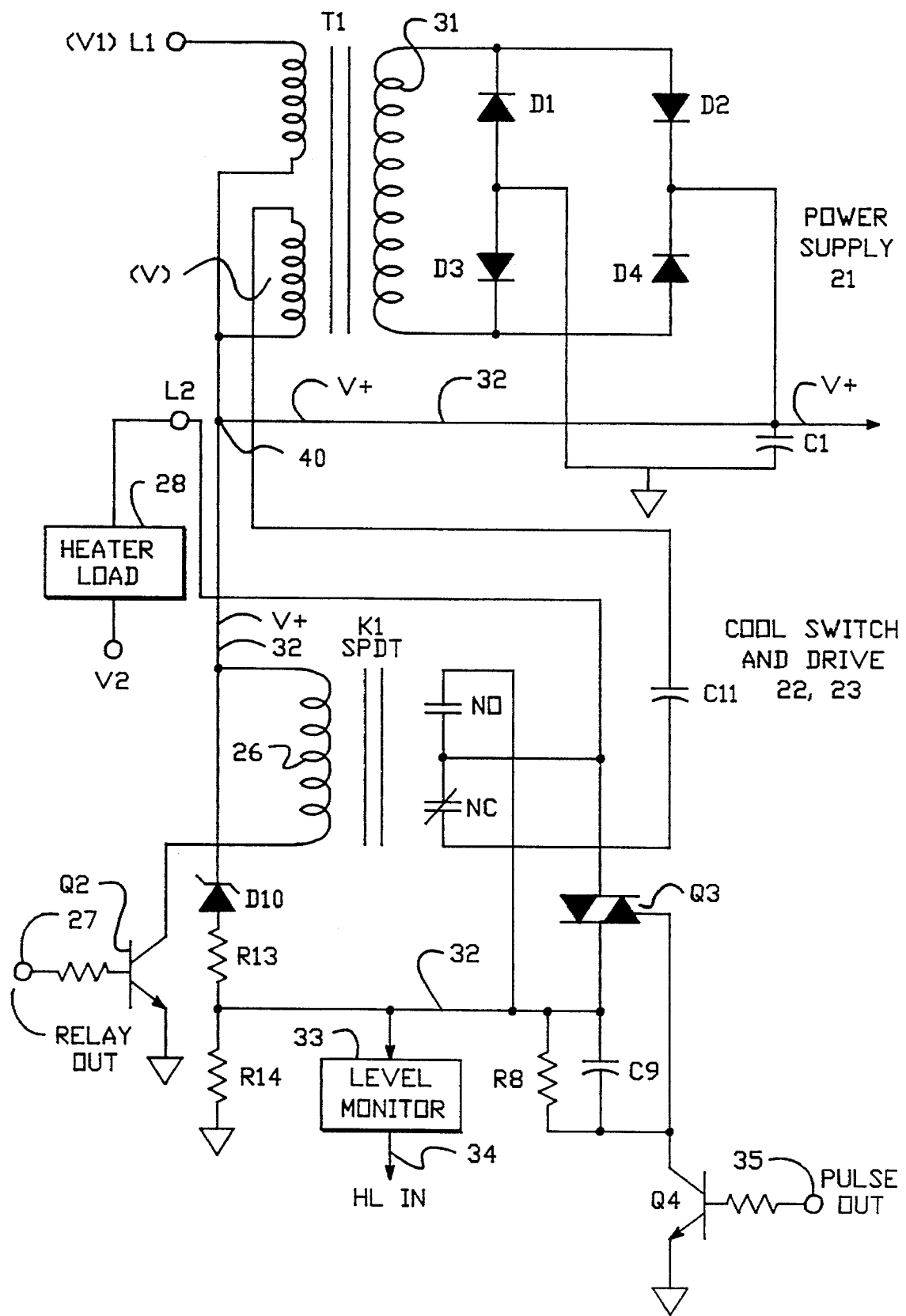
FIGS. 2 through 5 are circuit schematics respectively illustrating the blocks shown in FIG. 1.
Figure 3:
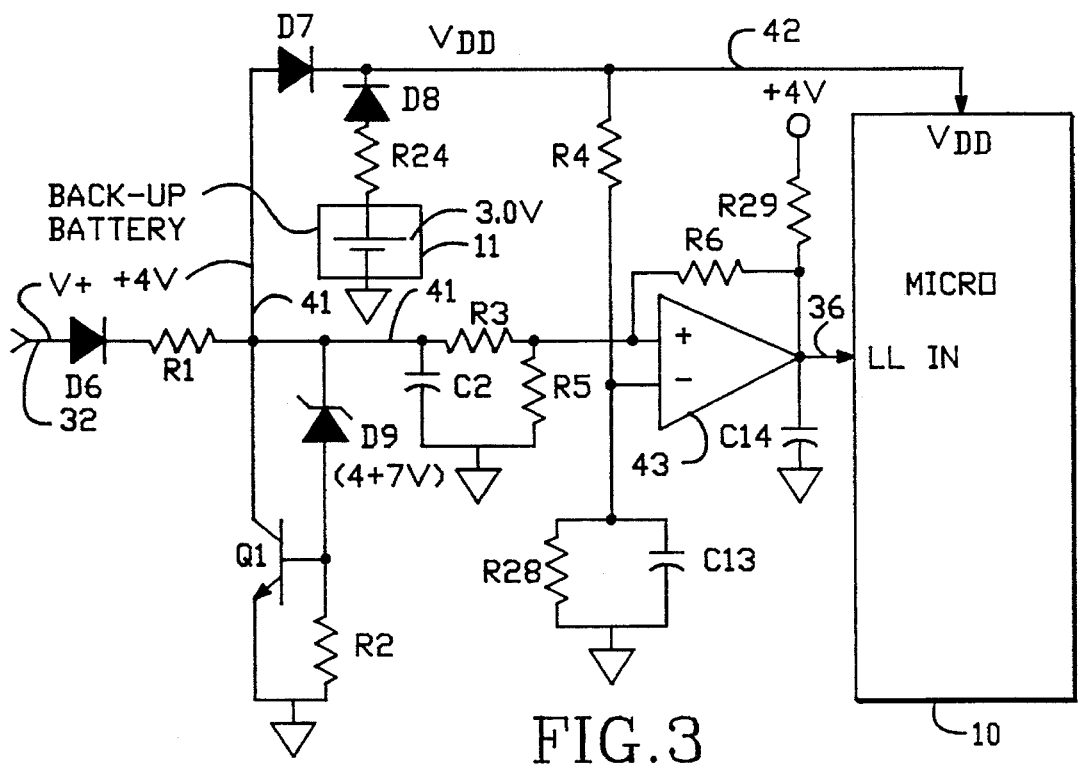

FIG. 2 illustrates in circuit detail power supply 21 and cool switch and drive 22, 23. The remainder of the power supply is shown in FIG. 3. Except for the single pole double throw (SPDT) switch K1, the circuit is very similar to the circuit shown in the above pending patent application. The relay or switch K1 is illustrated in FIG. 2 as a single pole double throw type and has one set of contacts designated NO for normally open and the other set designated NC for normally closed; in other words the relay K1 is shown in its unenergized state, that is the relay coil 26 is not energized. The relay coil 26 of course is energized by the transistor Q2 which connects one side of the coil to common. Q2 is activated from the microcontroller 10 by means of the "relay out" control connection 27. In the heater off mode condition switch K1 effectively provides an open circuit for the heater load 28. Such heater load has one side connected to line voltage V2; the circuit path then extends to the terminal L2 of the two terminal line voltage thermostat and goes through the normally closed (NC) portion of the switch K1 through a series blocking capacitor C11, through the voltage winding of the transformer T1 through the current winding (I) of that transformer and then to the terminal L1 which is also the other side V1 of the line voltage.

The circuit presents a high series impedance to the line voltage and thus the heater load current is limited to hundredths of amperes providing no perceptible heating at the heater load. The line voltage appears mainly across primary voltage winding (V) and capacitor C11. The voltage across the primary winding is stepped down through the transformer T1 and appears on the secondary winding 31. Rectification provided by diodes D1 through D4 appears on the line 32 as a d.c. voltage V+. Diodes D1 through D4 provide full wave rectification and capacitor C1 is a filtering capacitor. This voltage, also connected to relay coil 26, must be adequate to provide pull-in of the relay. Thus on line 32 there is a level monitor 33 which senses the level of this voltage and when it is adequate to pull-in, the output on line 34 which is connected to the microcontroller 10, designated HL IN provides an indication to the microcontroller that the relay may be activated and this is done on the line 27 "relay out". The relay activated, however, only when the temperature control routine provides an indication that heat is desired. In the heater on mode, relay K1 is activated through relay coil 26 and the conditions of the contacts are reversed, the normally open contacts now being closed, and the normally closed contacts being open. In this condition the switch directs all load current through the current winding (I) of transformer T1. That is, the current passes through the heater load, the terminal L2, through the NO contacts and then on line 32 through the current winding to the other side of the line. The current winding presents a very small impedance in series with the heater thereby allowing most of the line voltage to appear across the heater. This load current is stepped down through transformer T1 and via rectification again provides a d.c. voltage on line 32.

A triac Q3 is pulsed on via the pulse out control 35 to the transistor Q4 (from micro 10) during contact transition of the K1 relay. Resistor R8 and capacitor C9 are placed between the triac gate and line 32 to prevent false turn on. Use of such a triac to snub the relay contacts is disclosed in the above patent application.

With respect to the circuit shown in FIG. 2, for purposes of simplification, various protective regulators and flyback diodes have been eliminated. For example, between terminal L2 and line 32 there would be a protective overvoltage varistor.

Referring now to FIG. 3 and also making a brief reference to FIG. 1, FIG. 3 shows the backup battery 11 which has in this case a lithium battery with nominal voltage of 3 volts. The remainder of the power supply 21, and the microcontroller 10 are also shown. The other portion of the level monitor 19, as illustrated in FIG. 1, has an input LL IN to the micro 10 which is designated as line 36. The input to the circuit of FIG. 3 is the V+ line 32 which is of course the d.c. voltage, which is across C1 (see FIG. 2).

This voltage on line 32 across C1 is a variable clamped voltage between 5 volts and 13.5 volts d.c. This is a relay activation voltage of course. Referring also to FIG. 2, at the line 32, near the level monitor 33, nonlinear loads including D10, R13, R14 along with R1 and Q1 (see FIG. 3) are critical to the heater on load where they minimize the power draw on the transformer T1 when the T1 secondary voltage is low. When higher current levels are being sourced by the T1 secondary (due to high heater loads), the transistor Q1 (see FIG. 3) and Zener diode D10 provide the nonlinear load and the resistors R1, R13 and R14 provide current limiting so as to keep voltages and power loss on the secondary circuitry at acceptable levels. The voltage on line 32, as clearly illustrated in FIG. 2, supplies the relay coil and triac (Q3) gate drive. As discussed in the above pending application, in order to directly drive the triac gate with no isolation, this second regulated level which is normally isolated from line voltage by the transformer T1, must be directly referenced back to the primary side of T1, as is illustrated. Thus, see the connection node 40 in FIG. 2.

The voltage on line 32 is regulated to the common d.c. output voltage which ranges from 4 to 4.4 volts d.c. and provides the common d.c. power output which powers all of the control circuitry including the microcontroller 10. Referring to FIG. 3, regulation is provided by components D6, D9, R1, R2, Q1 and C2. Zener diode D9 does the actual regulation. Capacitor C2 filters out low frequency noise, diode D6 prevents back discharge of C2, and resistor R1 is a voltage drop resistor. Thus the line 41 indicated as +4 volts is the main d.c. output which supplies micro 10 and related electronics. This is illustrated in the drawings as +4 V.

The power supply of micro 10 from line 41 is via the dropping diode D7 which provides on line 42 a voltage slightly lower than the nominal 4 volts on line 41. Connected to line 42 is the backup battery 11, the resistor R24 and the series connected diode D8. Since the line 42, in normal situations, is at a level higher than the nominal battery voltage of 3 volts, the diode D8 in essence is an effective open switch whereby any current drain from the battery is prevented. In addition the dropping diode D7 which provides a somewhat lower voltage on the line 42 and which is connected to a negative input of a comparator 43 compares this with the greater voltage on line 41 to the positive comparator input, the output of the comparator 36 providing a signal on line 36 to the micro indicating that power is present (that is being derived from the secondary 31 of the transformer T1). Auxiliary components of comparator 43 include the resistors R3 through R6, R28 and R29, and capacitors C13 and C14.

When power is lost, the diode D8 becomes conductive since the voltage on line 42 would be less than the 3 volt battery voltage. The diode D7 prevents any circuitry besides the microcontroller from drawing current from the battery. Comparator 43 is activated (since line 41 is lower than 3 volts) to provide a signal on line 36 indicating to the micro 10 that power is lost so a special low power mode may be gone into.

Figure 6:
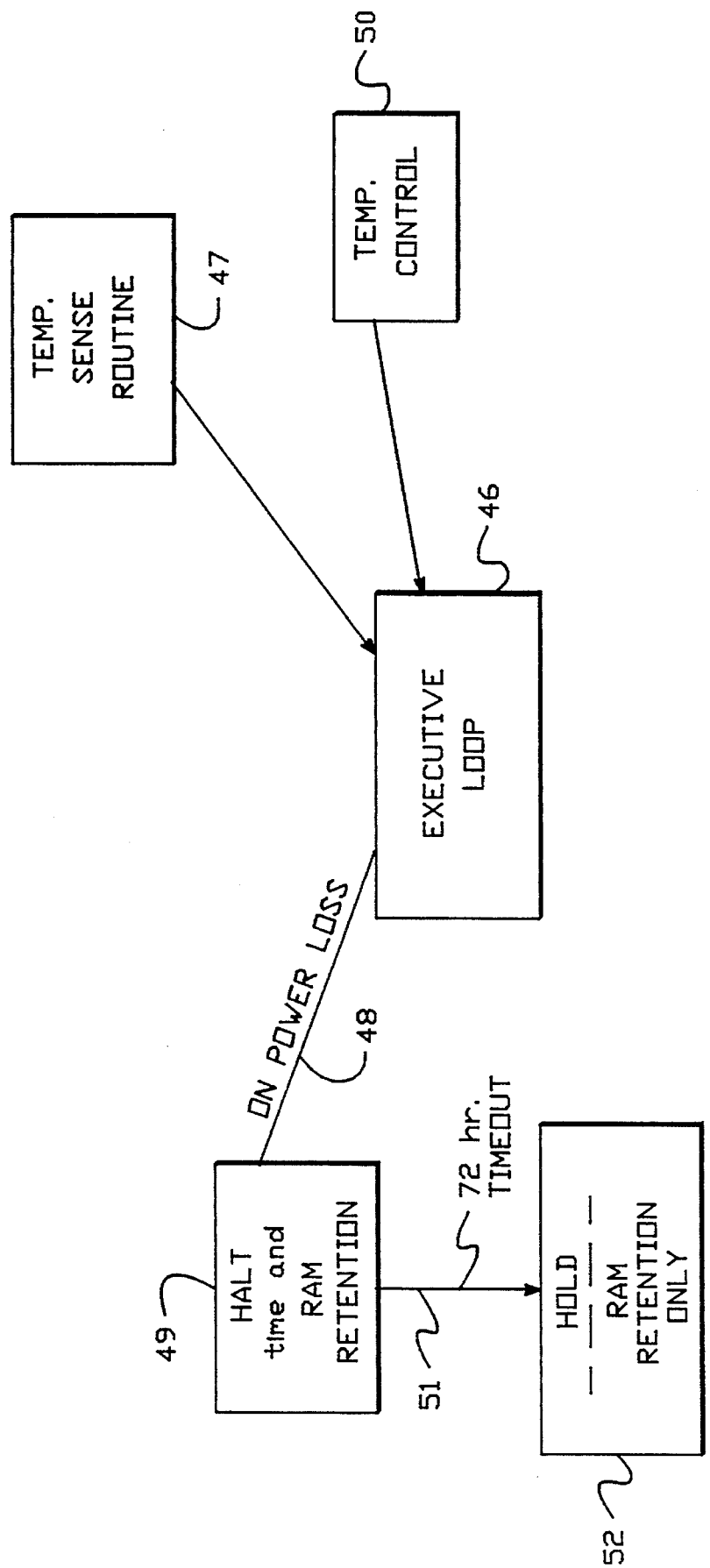
FIG. 6 is a flow chart illustrating various software routines that perform the functions of the invention.

FIG. 6 is a high level diagram of the software of the micro 10. The housekeeping functions of the micro of course are provided by the executive loop 46, a temperature sensing routine is indicated by the block 47 and temperature control 50. If power is lost then, as indicated on the line 48, micro 10 is placed in the halt mode of block 49. This causes the system clock to run more slowly to conserve power. Moreover the halt mode is such that only the time of day and the random access memory (RAM) (an integral part of micro 10) is retained. Of course, on power loss indication line 48 occurs due to the input to LL (36). Then as indicated by line 51, a predetermined timeout (e.g., 72 hours) is determined by the timing of the micro 10 and it goes into a hold mode indicated at block 52 where only random access memory is retained. Since the time mode as illustrated in block 49 will utilize about two-thirds of the power consumed, the hold mode where only the RAM memory is retained saves a significant amount of power to greatly extend the life of the battery 11.

Figure 4:
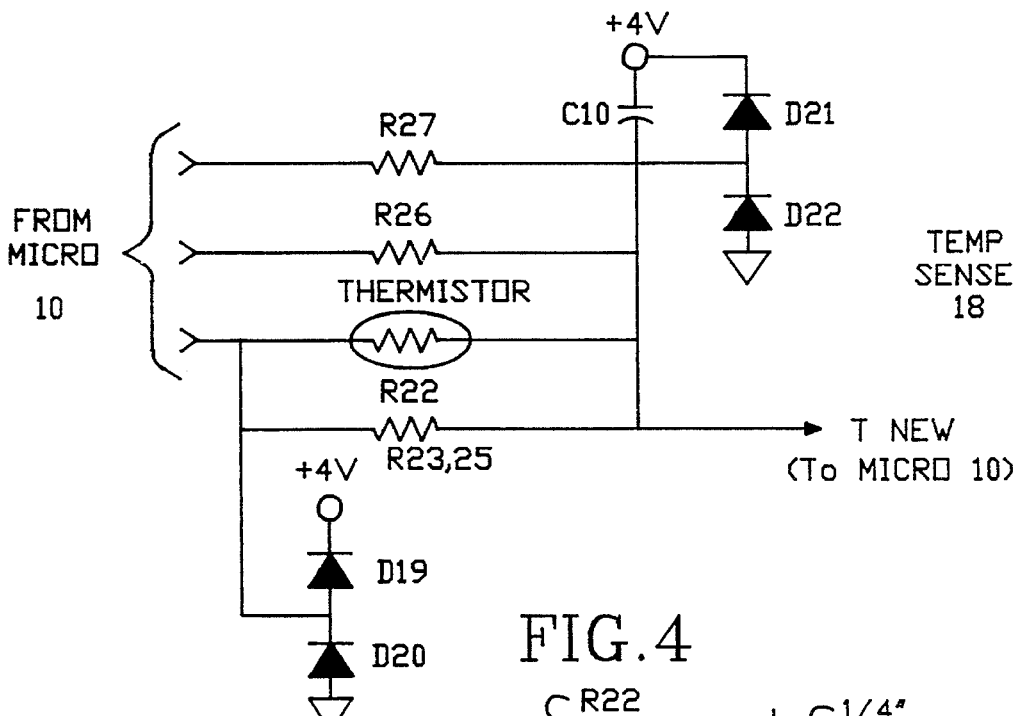

Now referring to FIG. 4, which is the temperature sensing circuitry 18 (see FIG. 1), in general temperature sensing is accomplished by comparing the RC charge characteristics of the parallel combination of thermistor R22 with series resistors R23 and R25 against the charge characteristic of resistor R26. The resistance of the thermistor is proportional to the temperature and a comparison of the RC charge characteristic is also proportional to the temperature. The actual temperature is calculated in software. (This will be discussed in conjunction with FIG. 7). For each temperature measurement that micro 10 discharges the capacitor C10, through the resistor R27 and then charges capacitor C10 via calibration resistor R26. The time is measured from when the capacitive charge is started to when a transition occurs on line T IN. This time is the calibration time. The same procedure is repeated for the thermistor where the thermistor R22 in parallel with linearizing resistors R23 and R25 measure a sensed temperature time. The resistor values for R23, R25, and R26 are carefully selected for improved accuracy and to simplify the software implementation for the temperature calculation. Diodes D19 through D22 provide static protection.

Figure 5:
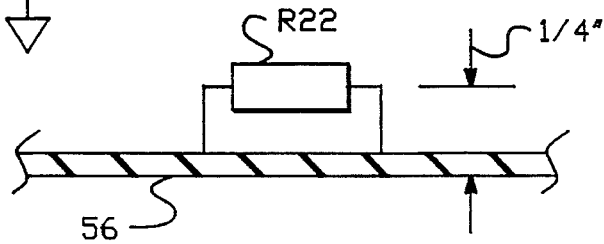
Figure 7:
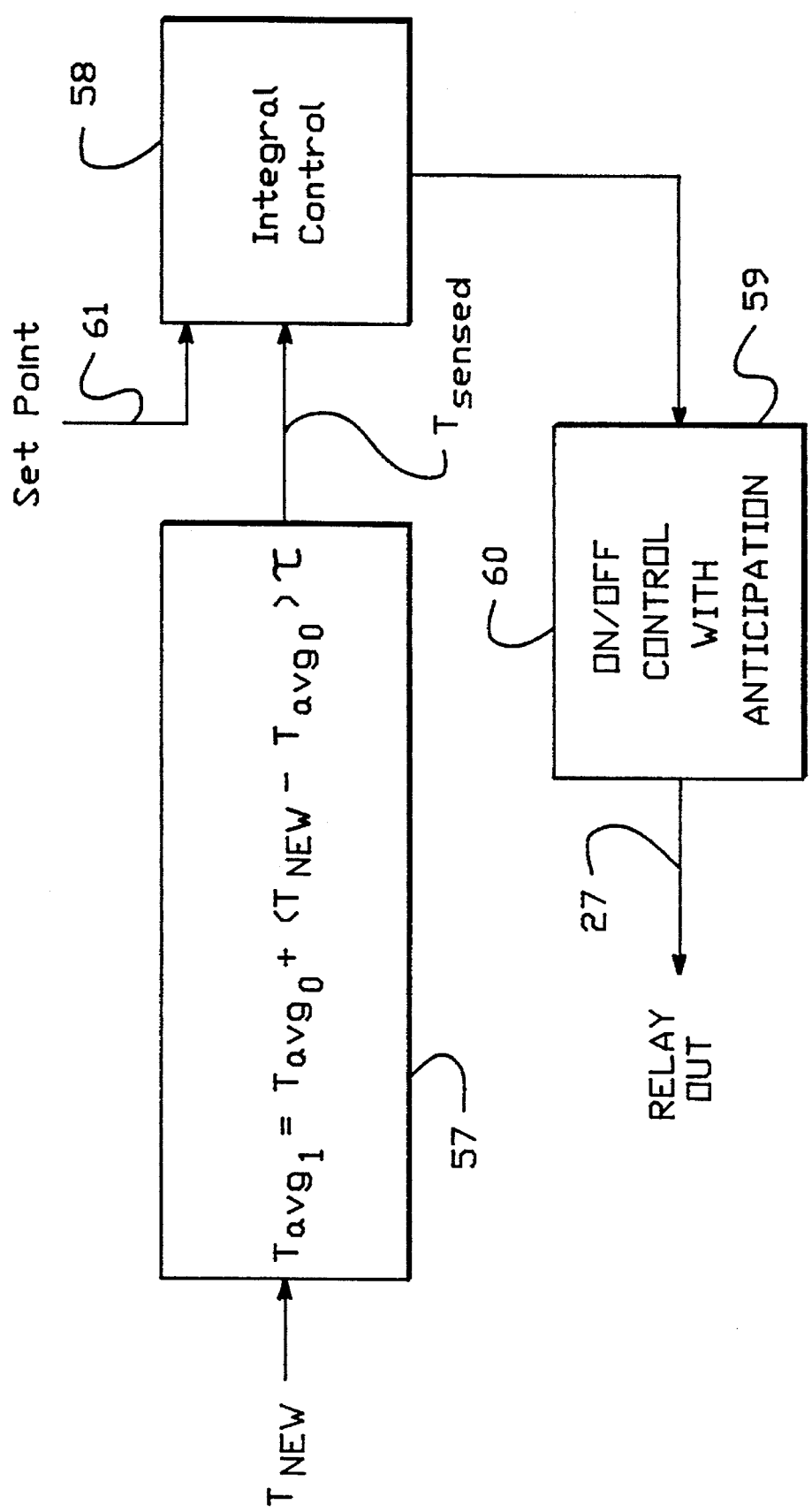
FIG. 7 is a block representation of a temperature control routine of FIG. 6.

In accordance with the present invention, the thermistor R22 as illustrated in FIG. 5 is mounted on a circuit board 56 and is spaced as illustrated approximately one quarter inch above the board. This reduces temperature sensing errors due to thermal coupling between the mounting board and thermistor, thereby leading to higher sensitivity to undesirable immediate temperature swings in the vicinity of the thermostat device. However, because of this rapid response, a time delay filter for smoothing temperature changes must be utilized to prevent excessive swings in the heating cycle. Thus as illustrated in FIG. 7, in the block 57, the sensed temperature T NEW is processed as indicated to smooth filter it or provide an effective time delay for rapid temperature changes. Specifically the previous temperature, Tavgo, has added to it, a filtered version of the new temperature which is the difference between Tavgo and the new measured temperature Tnew multiplied by a constant, Tau. This provides a Tsensed which is filtered to provide an effective time constant for the remainder of the temperature sensed control circuit.

This temperature control (see block 50, FIG. 6) includes the above filter 57 to reduce the effects of rapid temperature changes in the vicinity of the thermostat, an integral control at 58 to prevent a temperature droop, and anticipation control as shown at block 59 to reduce swings in the room temperature provided by the heater. The on/off control is cycled in response to the set point 61 provided by the customer, the filtered sensed temperature, and the integral and anticipation control values to provide the output signals 27 and 35 to the cool switch drive 23 (see FIG. 1). Thus an improved two terminal line voltage thermostat has been provided.

What is claimed is:

1. A two terminal line voltage thermostat including a switch for connecting said line voltage across a heater load connected to one of its terminals with the other of the two terminals connected to said line voltage, said thermostat comprising:

a transformer having voltage and current primary windings and a secondary winding, said switch in a heater on condition energizing only said current winding and in a heater off condition energizing both said voltage and current windings;

blocking capacitor means connected to said voltage winding for providing a high impedance series circuit to said heater load with said switch in said heater off condition;

a relay coil for actuating said switch between said heater on and heater off conditions and connected to said current winding;

temperature responsive means receiving power from said secondary winding in both said heater on and heater off conditions;

integrated circuit controller means responsive to said temperature responsive means for actuating said relay coil and connected to and receiving power from said secondary winding;

backup battery means connected to said integrated circuit controller and energizing said controller in response to a loss of power from said secondary winding, including means for preventing any current drain from said battery when power is being received from said secondary winding;

said means for preventing any current drain including diode means connected to said secondary winding, for regulation to a common d.c. power output of a predetermined level for said integrated circuit controller and said temperature responsive means; said battery means having a voltage less than said predetermined level and including a diode series connecting said battery means to said common d.c. output to provide an effective open switch when said predetermined level is higher than said nominal battery voltage whereby current drain is prevented; comparator means for comparing said battery voltage to said common d.c. output level, and for providing a binary output signal when said common d.c. output level drops in value below said battery voltage.

2. A thermostat as in claim 1 where one input to said comparator includes said common d.c. output and the other is the common d.c. output dropped by a diode in series with such output, such diode also being coupled to said series connected diode to said battery means.

3. A thermostat as in claim 1 where the binary output of said comparator drives an input of said integrated circuit controller means which is responsive to said output of said comparator means to indicate a common d.c. power loss, said integrated circuit controller means having a halt mode and a hold mode, said halt mode being activated in response to said power loss to cause said integrated circuit controller to retain only its random access memory (RAM) and time-of-day function and to eliminate all other power using functions, said integrated circuit controller including timing means for providing a timeout of a predetermined number of hours to switch to a hold mode where only RAM retention occurs and said time-of-day is not supported, whereby a significant amount of energy is saved, thus extending the life of said battery.

4. A thermostat as in claim 1 where said controller means interfaces with a keypad and display for customer programming and operational status display.

5. A two terminal line voltage thermostat including a switch for connecting said line voltage across a heater load connected to one of its terminals with the other of the two terminals connected to said line voltage, said thermostat comprising:

a transformer having voltage and current primary windings and a secondary winding, said switch in heater on condition energizing only said current winding and in a heater off condition energizing both said voltage and current windings;

blocking capacitor means connected to said voltage winding for providing a high impedance series circuit to said heater load with said switch in said heater off condition;

a relay coil for actuating said switch between heater on and heater off conditions and connected said current winding;

integrated circuit controller means for actuating said relay coil;

temperature responsive means receiving power from said secondary winding in both said heater on and heater off conditions, said temperature responsive means including a thermistor spaced from a mounting board to reduce temperature sensing errors due to thermal coupling between the mounting board and thermistor leading to higher sensitivity to undesirable immediate temperature swings in the vicinity of the thermostat, said integrated circuit controller means requiring relatively less said sensitivity and thus incorporating time delay filter means for smoothing rapid changes in the temperature sensed by said thermistor and for subtracting a previously sensed temperature by the thermistor from a newly sensed temperature, this difference being multiplied by a selected constant and then added to the previous temperature to provide a filtered sensed temperature, said constant by which the difference is multiplied being selected to provide an effective time constant of minutes, said integrated circuit controller means including a temperature control routine requiring said time constant to provide integral control to eliminate droop and anticipation control to reduce swings in the temperature provided by said heater load.

* * * * *